May 1, 1951 N. J. GRAN 2,550,995
CHAIN LINK
Filed July 2, 1947 4 Sheets-Sheet 1
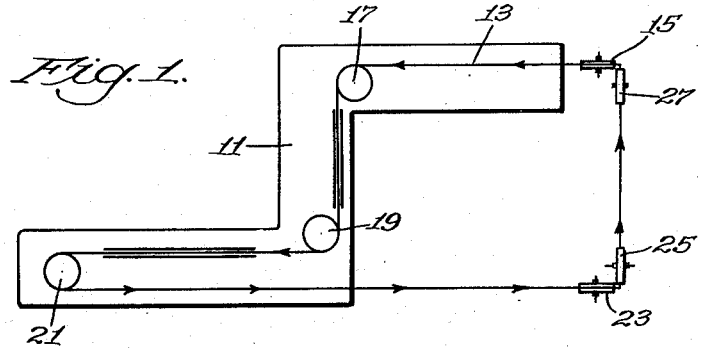
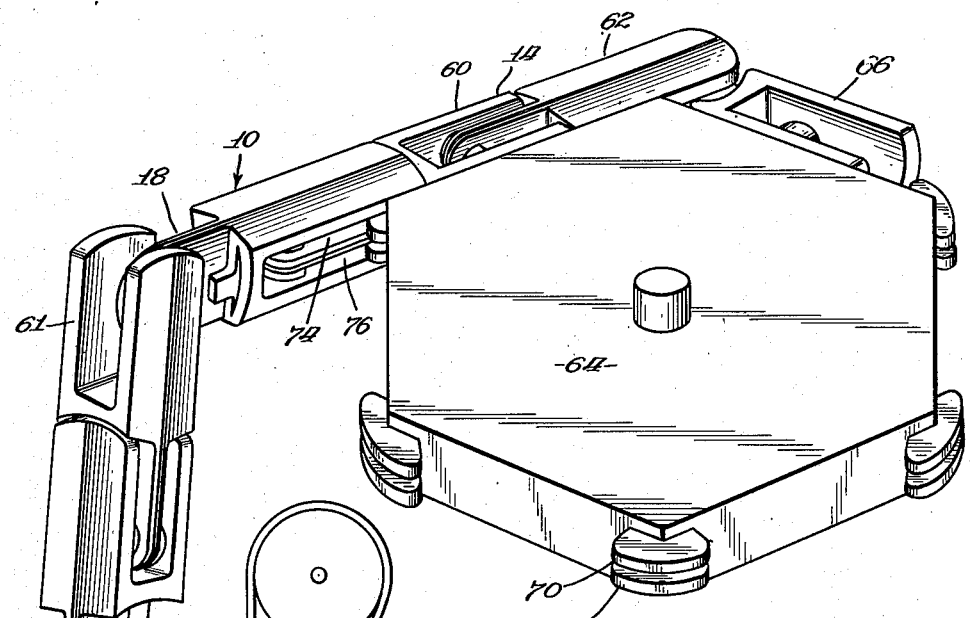
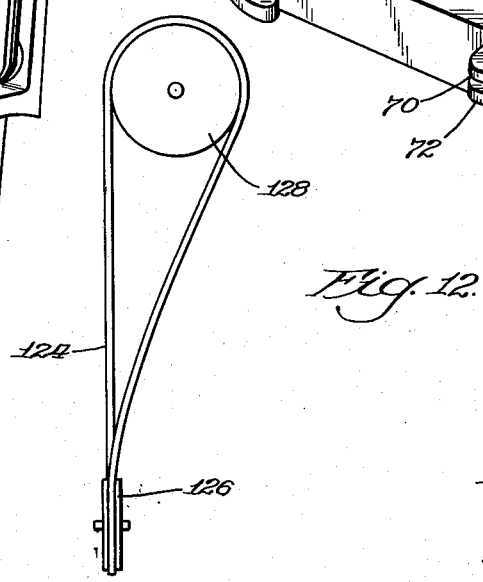
INVENTOR.
Norman J. Gran
BY
Wilfred S. Stone
Atty.

May 1, 1951

N. J. GRAN 2,550,995

CHAIN LINK

Filed July 2, 1947

INVENTOR.
Norman J. Gran
BY
Wilfred S. Stone
Atty.

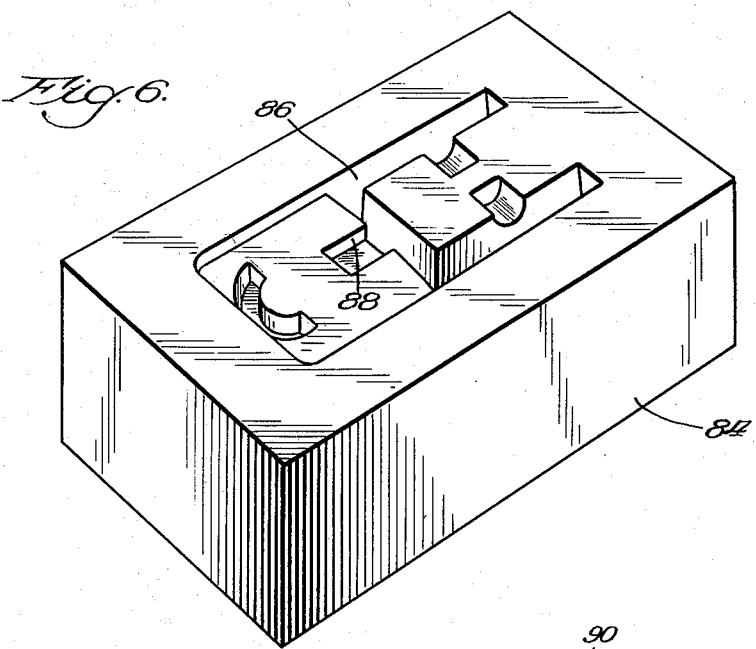
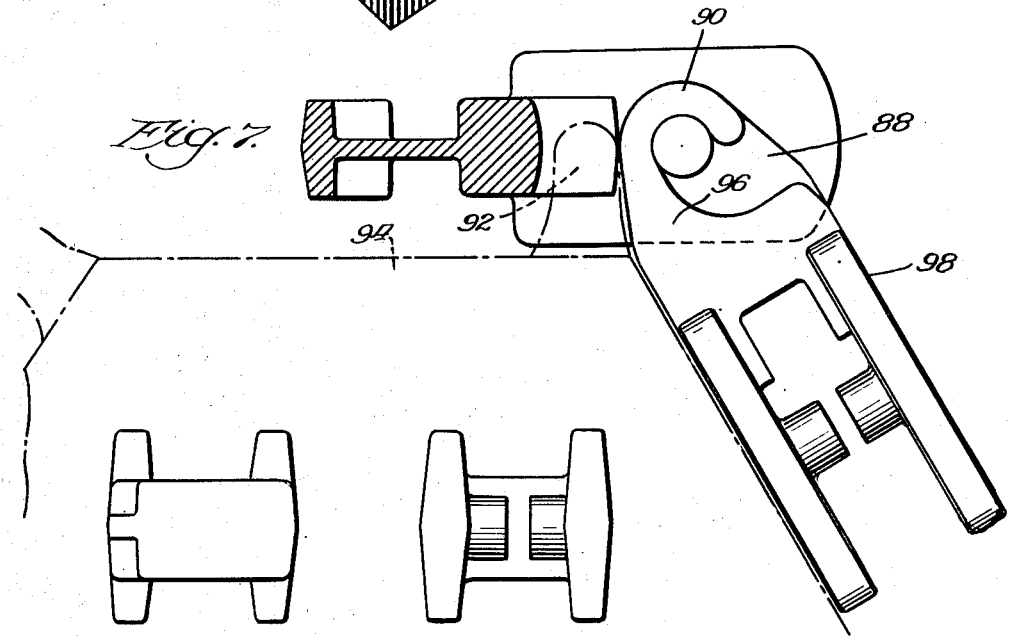

May 1, 1951 N. J. GRAN 2,550,995
CHAIN LINK
Filed July 2, 1947 4 Sheets-Sheet 4
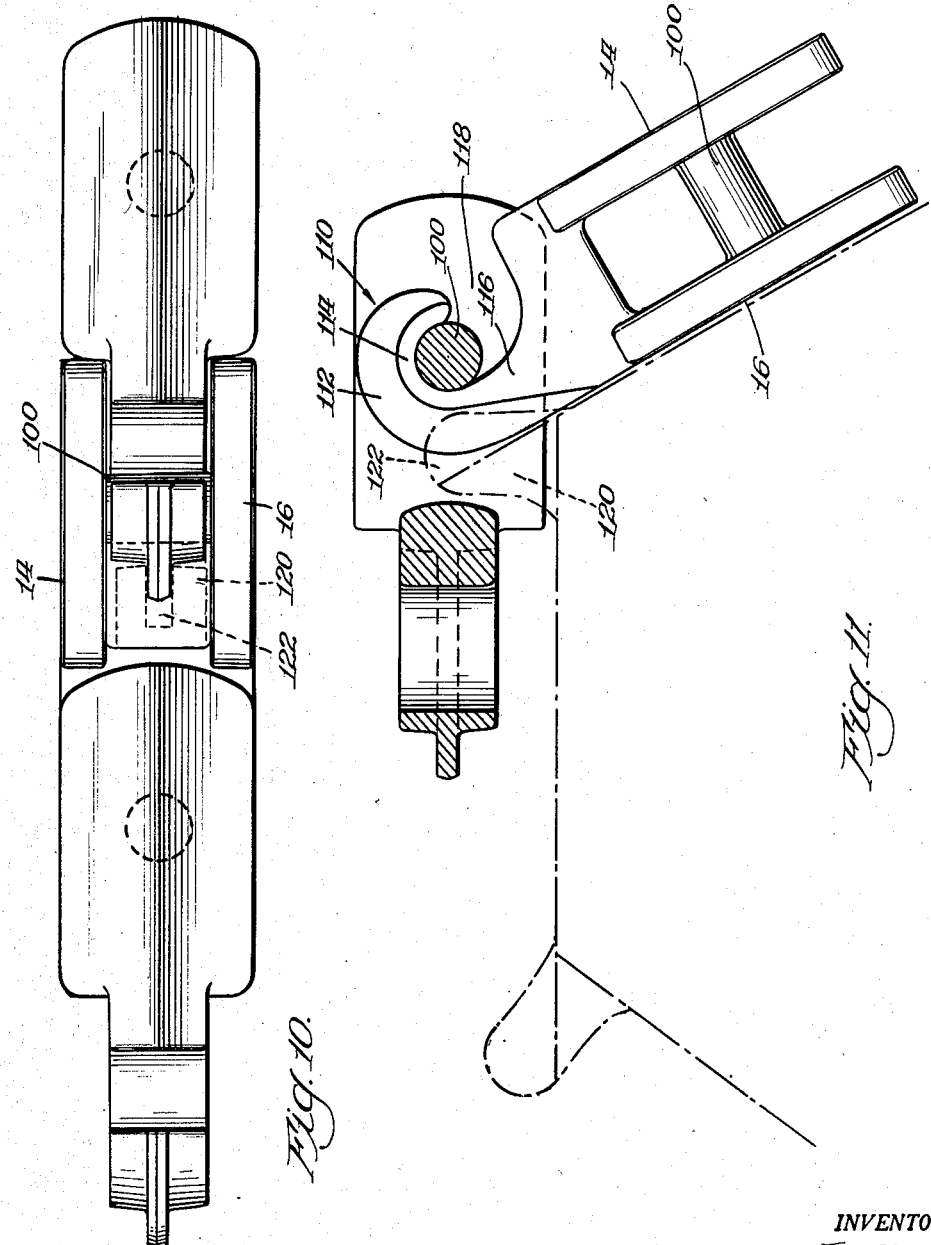
INVENTOR.
Norman J. Gran
BY Patented May 1, 1951

2,550,995

UNITED STATES PATENT OFFICE 2,550,995

CHAIN LINK

Norman J. Gran, Chicago, Ill.

Application July 2, 1947, Serial No. 758,643

16 Claims. (Cl. 74—249)

This invention relates to a conveyor or drag chain and more particularly to a link for such a chain. A drag chain is commonly used to transport articles from work position to work position in a factory or processing plant, as in a channel on a table. Thus, referring to Fig. 1, 11 identifies the top of a work table along which moves a drag chain 13. This chain operates over sheaves 15, 17, 19, 21, and 23. It may be carried downwardly and then moved at right angles over sprockets 25 and 27, one of which is driven. A drag chain is subject to heavy wear and it is desirable to employ links that may be quickly replaced. Moreover, standard length chains are not practical because each factory layout is special and the length of the chain will vary to meet the particular specifications of a job.

A wide variety of such chains is available on the market but while one chain will perform one function, it performs only improperly some other desirable function. Thus, again referring to Fig. 1, the chain illustrated must be capable of articulation in two planes at right angles to each other. As illustrated, the chain must have sprocket tooth sockets capable of driving from the bottom or top of the chain. In some installations, it might be desirable to drive the chain from either side, as by replacing sheaves 17 and 19 with sprockets.

The links of a drag chain are commonly castings or forgings. A forged link is superior to a cast link because it is much stronger and will wear better, and because its operating surfaces are smoother and such links articulate properly immediately upon installation. Cast links require a period of chain operation before their rough surfaces are worn down to a point where they function smoothly and quietly. On the other hand, a forged link is comparatively difficult and costly to make. Existing links capable of articulation in two planes require at least a double forging operation, that is, movement of the forging ram along one axis and then movement of a second ram along an axis usually at right angles to the first. Additionally, most links employ separate holding pins, and may require at least one drilling operation.

The first object of this invention is to provide a link which may be joined with other identical links to form a chain which is flexible in two planes at right angles to each other.

The second object of this invention is to provide a link having driving sockets on opposite faces so that when the link is combined with a second link, a chain, thus formed, may be driven from any one of four sides.

The third object of this invention is to design a link which may be forged in its entirety by a ram moving along only one axis, while still possessing the features of a four-sided drive with identity of links.

Three embodiments or types of applicant's link are shown, but the second two are modifications of one element of the first type of link. The first type requires a double-tooth sprocket. Such a sprocket will be of special design and, therefore, costly. This may be undesirable. The second type link is so modified that it will operate on a single-tooth sprocket, and this design nevertheless retains requisite strength. The third type of link seeks to cure what may turn out to be a structural weakness in the first and second types.

In the drawings comprising four sheets:

Fig. 1 is a plan, schematic illustration of a table and drag chain layout;

Fig. 2 is a perspective view of a chain employing applicant's first type of link and illustrates the chain being driven by a sprocket in one plane and articulated in a second plane at right angles to the first;

Fig. 6 is a perspective view of a die for forging one-half of applicant's link;

Figs. 7, 8, and 9 are side and end views of applicant's second type of link;

Figs. 10 and 11 are views of applicant's third type of link; and,

Fig. 12 illustrates applicant's link being driven from both sides by a single sprocket.

The first type of link

Figure 3:
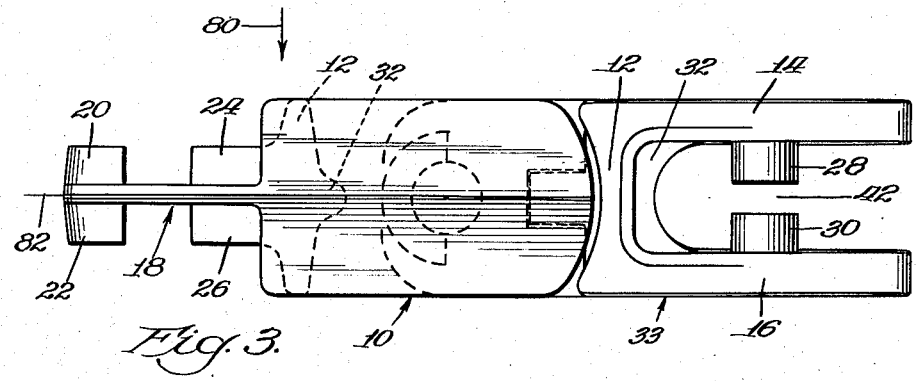
Fig. 3 is a plan view of two of applicant's links coupled together.
Figure 4:
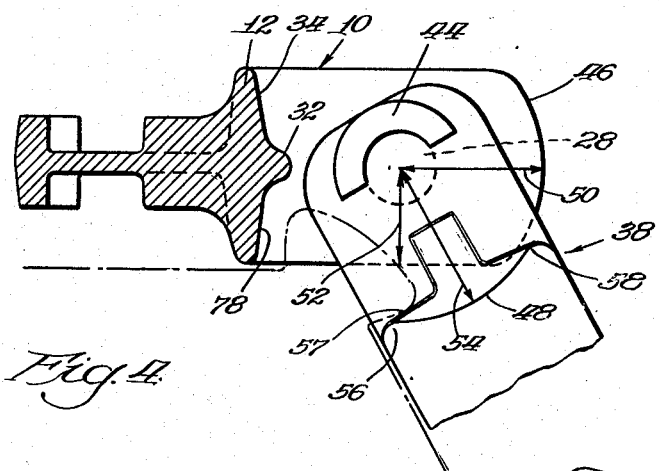
Fig. 4 is a center section of the two links illustrated in Fig. 3, and shows the degree of safe articulation of applicant's links and the means of hooking them together.

Referring to Figs. 2, 3, and 4, the numeral 10 generally indentifies a link consisting of a base 12 carrying on one side two parallel, spaced side walls 14 and 16 and having projecting from its opposite side a tongue 18. The tongue 18 is disposed in a plane at right angles to the planes of the side walls 14 and 16 and is mounted centrally of the base 12. At its outer end, on its upper and lower surfaces, the tongue 18 carries semi-circular journals 20 and 22, having their concave surfaces facing the base 12. On the upper and lower surfaces of the tongue 18, but adjacent to the base 12, are supporting lands 24 and 26. Mounted on the inside surfaces of the walls 14 and 16 are two aligned trunnions 28 and 30 whose ends are spaced from each other by a distance slightly greater than the thickness of the web of the tongue 18. The base, referring to Fig. 4, carries a transverse reinforcing bead 32 and the walls 34 and 78 are sloped toward the bead.

In order to connect two links, referring to Fig. 4, the link 38 is positioned at right angles to the link 10 and the web of the link 38 is moved inwardly through the space 42, referring to Fig. 3, until its semi-circular journals such as 44 are over the associated trunnions such as 28 and 30. The link is then drawn downwardly so as to seat the semi-circular journals such as 44 over the trunnions and is rotated counterclockwise so as to lock the link in position.

The links are locked together because of the action of the convex circular end 46 on each of the walls 14 and 16 with the concave wall 48 on the tongue side of the base 12. The relationship of the radius 50 to the distance 52 is critical. The radius 50 is slightly greater than the distance 52 plus the radius of the trunnion 28 and the radius 54 is slightly greater than the radius 50. In moving the link 38 into the link 10, it is necessary to clear the high points 56 and 58 and no more. The angle of the link 10 to the link 38 as illustrated in Fig. 4 is approximately 60 degrees. If this angle is increased, there is a possibility of the two links becoming separated. However, the diameter of the sheaves and sprockets over which the chain will operate is sufficiently great so that the links never exceed a 60-degree angle with respect to each other and this maximum angularity may be substantially reduced.

Referring to Fig. 2, it will be noted that each adjoining pair of links is flexible in one plane only. Thus, referring to links 60 and 62, they are rigid in the plane of the sprocket 64. Their flexibility in a vertical plane is illustrated by links 10 and 61.

Applicant's chain is driven by a twin-tooth sprocket 64. A pair of teeth 70 and 72 are in transverse alignment and have the configuration illustrated in Fig. 4. The sprocket here suggested is of comparatively small radius. Each tooth passes into the spaces 74 and 76, referring to Fig. 2. The bearing surface of the tooth is against the shoulder 57, see Figs. 4 and 5, so that the chain as there illustrated is moving from left to right. However, the chain can be driven by the sprocket in the opposite direction in which event the tooth will be engaging the wall 78 of the base 12. The shape of the teeth 70 will vary somewhat depending upon the radius of the sprocket.

Returning to Fig. 2, it is seen that the chain can be driven from the side wall or the bottom. It is evident that the chain could be driven from the opposite side wall or the top.

Figure 5:
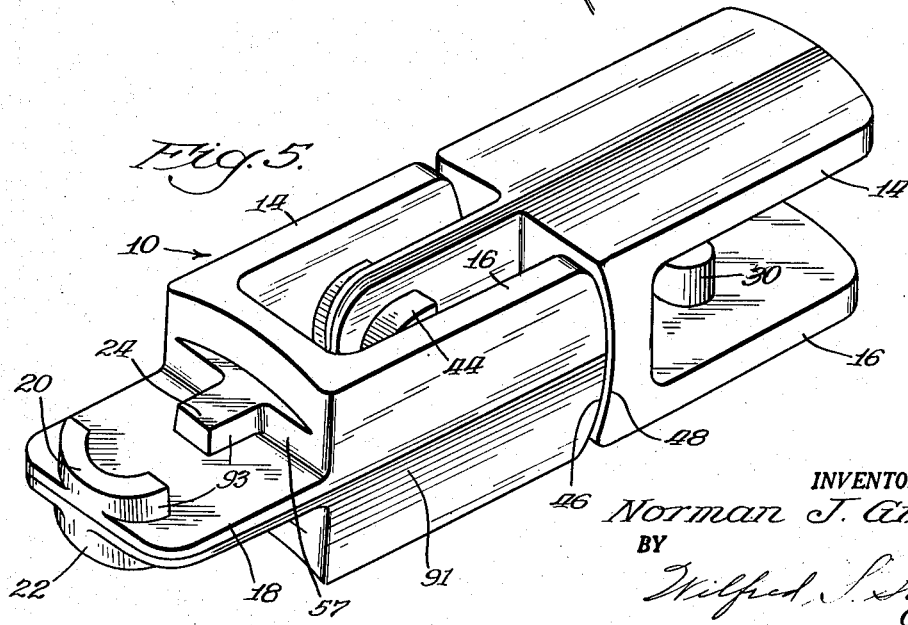
Fig. 5 is an enlarged perspective view of two of applicant's links.

The advantages and description of applicant's preferred form of link have thus far been directed to the mechanical features which make possible quick assembly, flexibility in two planes, and driving from all four sides. However, in designing the link, applicant was as much or more interested in providing a link which could be forged in a single operation by a ram moving along a single axis. As mentioned heretofore, existing links that can be articulated in two planes are either (a) castings, or (b) forgings made in two forging steps, firstly, by a ram moving along one axis and secondly, by a ram moving along an axis at right angles to the movement of the first ram. Such forgings are costly not only because they require a double operation but because they frequently require hand manipulation of each link between the two operations. Referring to link 10 in Fig. 3, while comparing it with link 33, it will be noted that a ram moving in the direction of the arrow 80 is not required to force any metal underneath a portion of a die provided two identical dies meeting along the line 82 are provided. Referring to Fig. 6, 84 is a die block. An upper die, not shown, is identical to this block. All side walls, such as 86 and 88, are sloped inwardly from a plane longitudinally bisecting the die, along a selected draft angle, in accordance with standard forging practice to facilitate removal of the forged links from the dies. Two of these dies produce the link as illustrated in Figs. 3 and 5 where the sloping walls are indicated by numerals such as 91 and 93. The inside walls of the journals 20 and 22 and the ends of the trunnions such as 30 are small in side area and are along very slight draft angles. The trunnions are almost imperceptible conic sections.

*The second type of link*

The second type of link is illustrated in Figs. 7, 8, and 9, and differs from the first type in the shape of the tongue. As in the first type, the tongue consists of a web 88 having semi-circular journals such as 90. The web, however, is cut away from each side so as to clear a single tooth 92 of a sprocket 94. This construction weakens the web and in order to compensate for this, a land such as 96 is formed integrally with one side of the journal 90 and the web 88 and the main portion of the link. Two links are, referring to Fig. 7, joined by holding link 98 vertically with the tongue downwardly and moving it to the left so that the web 88 passes between the trunnions until the journals are able to seat on the trunnions and then the link 98 is swung in a clockwise direction in the same manner as the links of the first type are assembled together. The links of this second type, however, can only be assembled from one side of a link.

It will be observed that here again the link may be formed by a forging ram moving along a single axis.

*The third type of link*

The third type is illustrated in Figs. 10 and 11 and is characterized by a shaft 100 formed integrally with the walls of the link. This shaft will overcome what experience in the field may show to be a weakness in the first and second type of links arising from the fact that the side walls 14 and 16 are maintained in parallel, spaced relationship solely by means of their connection to the base. It is not anticipated that this will prove to be a weakness, but one or two years of experience in the field with applicant's type of chain will be necessary to satisfactorily decide this point. Referring to Fig. 2, a spreading strain on two walls such as 14 and 16 occurs primarily when they are moving over a drive sprocket. The teeth of the sprocket 64 are engaging the link 66 which is pulling the link 62. There will be some lateral strain as the pair of links move over the sprocket tending to spread the walls 14 and 16 of link 60 even though link 60 is engaged by the next set of teeth on the sprocket. The shaft of applicant's third type of link will maintain the walls in proper spaced relationship.

The tongue on this type of link, referring to Fig. 11, is generally identified by the numeral 110 and comprises a central web 112 and a pair of semicircular journals such as 114. Here, again, a reinforcing land 116 joins one side of the semi-circular journal to the main body of the link and is integrally formed therewith. In order to clear the shaft 100, a slot 118 is cut through the web and terminates in the semi-circular journals 114. Two links are assembled together in the same manner as the type two link.

Here, again, the link may be forged by a ram moving along a single axis.

The shape of the teeth on the sprocket used with this type is slightly different from that employed in the first two types. A single-tooth 120 carries a slot 122 in which rides the web 112 of the tongue 110.

It will be noted that the sprocket tooth in the second and third types penetrate the center line of the link and this gives a more positive drive.

An interesting illustration of advantages to be derived from driving a chain of applicant's links from opposite sides is shown in Fig. 12. The chain 124 is being driven by sprocket 126 over a sheave 128 lying in a plane at right angles to the plane of the sprocket 126. The top of the chain is always toward the observer because its plane changes only as it moves over the sprocket. Consequently, the links engage the sprocket first on one side and then on the other, apportioning the wear on two sides instead of on one.

Having thus disclosed my invention, what I claim is:

1. A forged chain link comprising an integral body having top, bottom, side, and end walls, one element of a two component, pivotal coupler mounted on one end of the body, and the complementary element of the same type of coupler mounted on the other end of the body, all side walls of the body and coupler elements being at right angles to or along draft angles based on lines at right angles to a horizontal plane through the body and intercepting the side and end walls, and all other walls of the body and coupler elements facing away from that side of the plane on which the particular wall is located.

2. A forged chain link comprising an integral body having top, bottom, side, and end walls, one element of a two component, pivotal coupler mounted on one end of the body, and the complementary element of the same type of coupler mounted on the other end of the body and at right angles to its normal coupling position with the first element, all side walls of the body and coupler elements being at right angles to or along draft angles based on lines at right angles to a horizontal plane through the body and intercepting the side and end walls, and all other walls of the body and coupler elements facing away from that side of the plane on which the particular wall is located.

3. A forged chain link consisting of an integral body formed of two symmetrical, but reversed, halves as defined by a plane passed through the body and intercepting the side and end walls, one element of a two component, pivotal coupler mounted on one end of the body and divided by the plane, and the complementary element of the coupler mounted on the other end of the body and divided by the plane, all side walls of the body and coupler elements being at right angles to said plane or along draft angles based on lines at right angles to said plane, and all other walls of the body and coupler elements facing away from that side of the plane on which the particular wall is located.

4. A forged chain link consisting of an integral body formed of two symmetrical, but reversed, halves as defined by a plane passed through the body and intercepting the side and end wall, one element of a two component, pivotal coupler mounted on one end of the body and divided by the plane, and the complementary element of the coupler mounted on the other end of the body and divided by the plane, the second, complementary element being at right angles to its normal coupling position with the first element, all side walls of the body and coupler elements being at right angles to said plane or along draft angles based on lines at right angles to said plane, and all other walls of the body and coupler elements facing away from that side of the plane on which the particular wall is located.

5. A forged chain link comprising a base, a bearing horizontally mounted on one end of the base, and a journal complementary to the bearing vertically mounted on the opposite end of the base, all side walls of the base, bearing, and journal being formed along draft angles based on vertical lines parallel to the side walls, and all other walls of the base, bearing, and journal facing outwardly and clear of obstruction to the ends, top or bottom of the link.

6. A forged chain link comprising a base, a pair of spaced side walls extending from one side of the base, the surfaces of these walls and of that portion of the base between these walls being vertical or along draft angles based on parallel vertical lines, a horizontal shaft projecting inwardly from one of said walls and spaced from the base, a horizontal tongue extending from the vertical midpoint of the opposite end of the base, and an open-sided journal mounted on the outer end of the tongue with its axis vertical, the outer wall of said journal having a cross section such that it may be slipped between the shaft and the base of a similar link.

7. A chain link comprising a body portion, a vertical wall extending from one side thereof, a bearing projecting horizontally from said wall and spaced from the body portion, a horizontal tongue extending from the opposite side of the body portion, and an open-sided, semi-circular journal mounted on the face of the tongue with its concave face toward the body portion and its axis at right angles to the axis of the bearing.

8. A chain link comprising a base, a pair of spaced, vertical walls extending from one side thereof, a pair of axially aligned trunnions each extending inwardly from one of said walls and having their ends spaced from each other, a tongue extending from the opposite side of said base and having a thickness less than the distance between said trunnions, and an open-sided, semi-circular journal mounted on one side of the tongue with its concave face toward the base and its axis at right angles to the axis of the trunnions.

9. A chain link comprising a base, a pair of spaced, vertical walls extending from one side thereof, a pair of axially aligned trunnions each extending inwardly from one of said walls and having their ends spaced from each other, a tongue extending from the opposite side of said base and having a thickness less than the distance between said trunnions, and a pair of open-sided, semi-circular, axially aligned journals, one on each side of the tongue, with their concave faces toward the base and their axis at right angles to the axis of the bearing.

10. The chain link of claim 9 wherein a land is disposed on each surface of the tongue adjacent the base, the combined thickness of the tongue and two lands being slightly less than the distance between the spaced walls.

11. A chain link comprising a base, a pair of spaced, vertical walls extending from one side thereof, a bearing projecting horizontally between said walls, a curving end on each of said walls following an arc having the bearing axis as its center, a tongue extending from the opposite side of the body portion, an open-sided, semi-circular journal mounted on the tongue with its concave face toward the base and its axis at right angles to the axis of the bearing, and a concave wall on the base at each side of the tongue and following an arc having the journal axis as a center and having a radius slightly greater than the radius of the arc forming the end of the vertical walls.

12. A chain link comprising a base, a pair of spaced walls extending from one side thereof, a tongue extending from the other side thereof and in a plane at right angles to the planes of the spaced walls, an open-sided, semicircular journal mounted on the outer end of the tongue with its concave face toward the base, a bearing mounted in the space between the walls with its axis at right angles to the axis of the journal, said bearing being spaced from the base by a distance substantially exceeding the distance between the journal and the outer end of the tongue whereby the tooth of a sprocket may be inserted in the space between the two walls and between the base and the journal of another link mounted on the bearing.

13. An integral, forged chain link comprising a base, a pair of spaced walls extending from one side of said base, a shaft connecting and formed integrally with said walls, and a hook extending from the opposite side of said base, the opening of said hook being on an axis at right angles to the axis of the shaft.

14. A forged chain link comprising an integral body having top, bottom, side and end walls, one element of a two-component pivotal coupler mounted on one end of the body and the complementary element of the same type of coupler mounted on the other end of the body and at right angles to its normal coupling position with the first element, certain outside walls of the body and coupler elements facing in one or the other of two diametrically opposed directions and all other walls lying in planes parallel to said two opposed directions whereby all elements of the link may be forged by die members moving toward each other.

15. A drag chain link comprising a pair of substantially rectangular spaced walls having their outer surfaces lying in parallel planes and joined to each other along one side by a base, a flat tongue extending centrally from the opposite side of the base with its flat surfaces at right angles to the side walls and its outside edges extending between planes containing the outside of the side walls, said tongue being insertable between similar side walls of a similar link, one element of a two-component, pivotal coupler mounted between the side walls, and the complementary element of the coupler mounted on the tongue, whereby a chain formed of said links will have a top surface along which articles may slip.

16. A forged chain link comprising a base, a pair of spaced side walls extending from one side of the base, a shaft connecting the two side walls to each other and spaced from the base, and a hook extending from the opposite side of the base with the axis of its opening at right angles to the shaft, the thickness of the hook being less than the spacing between the side walls, all walls of the body, the shaft, and the hook facing in one of two diametrically opposite directions or lying in planes parallel to said two opposite directions.

NORMAN J. GRAN.

REFERENCES CITED

The following references are of record in the file of this patent:

UNITED STATES PATENTS

| Number | Name | Date |
| --- | --- | --- |
| 514,001 | Hamill | Feb. 6, 1894 |
| 1,804,701 | Mojonnier | May 12, 1931 |
| 2,009,157 | Zilles et al. | July 23, 1935 |
| 2,118,348 | Hoeffleur | May 24, 1938 |

FOREIGN PATENTS

| Number | Country | Date |
| --- | --- | --- |
| 342,820 | Great Britain | Feb. 12, 1931 |